No. 647,287. Patented Apr. 10, 1900.
J. P. BADE.
WINDOW SHADE ADJUSTER.
(Application filed Aug. 17, 1899.)
(No Model.)
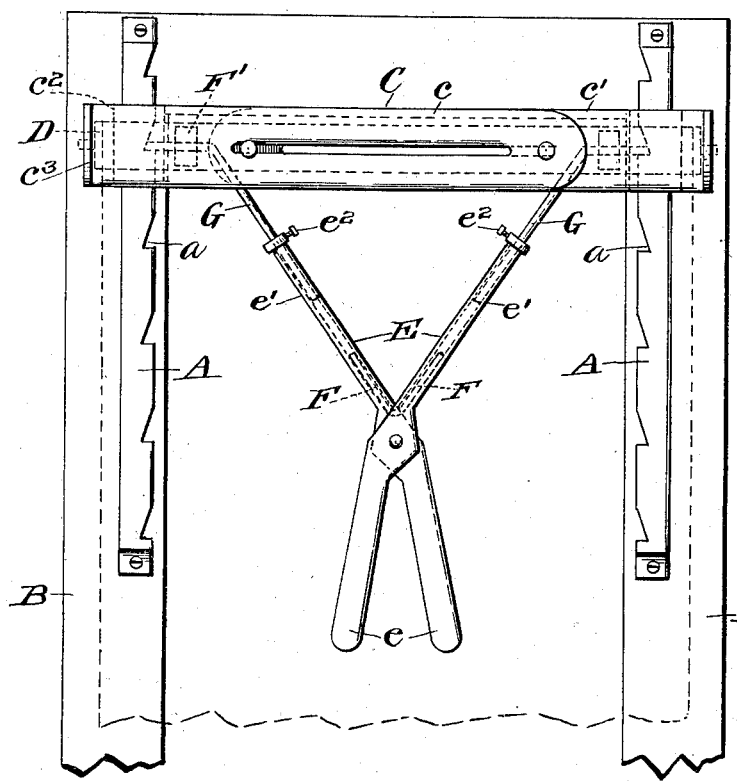
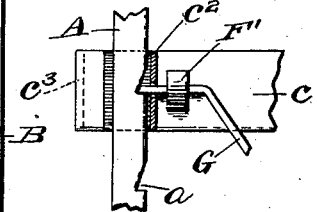
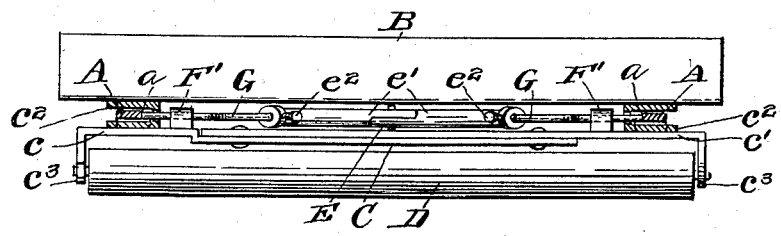
Witnesses
Jos. N. Blackwood
Hartwell P. Heath
Inventor
John P. Bade
by D. A. Gunick
Attorney

UNITED STATES PATENT OFFICE.

JOHN P. BADE, OF VIENNA, MISSOURI.

WINDOW-SHADE ADJUSTER.

SPECIFICATION forming part of Letters Patent No. 647,287, dated April 10, 1900.

Application filed August 17, 1899. Serial No. 727,557. (No model.)

*To all whom it may concern:*

Be it known that I, JOHN P. BADE, a citizen of the United States, residing at Vienna, in the county of Maries and State of Missouri, have invented certain new and useful Improvements in Window-Shade Adjusters, of which the following is a specification.

My invention relates to window-shade adjusters, and has for its object to provide a cheap, simple, and easily-applied device which can be used on any window and with any roller and shade and by which such roller can be raised or lowered at pleasure, enabling a single shade to be used, as desired, as a cover for the upper, middle, or lower part of the window and causing a considerable saving where the accurate management of light effects is necessary. This object I accomplish in the manner and by the means hereinafter more fully described in detail, and particularly pointed out in the claims, reference being had to the accompanying drawings, in which like reference-letters indicate like parts in all the figures.

Figure 1 is a front view of a window with shade, my invention being in place and the shade in dotted lines. Fig. 2 is a top plan view of same with guide-rails and slides in section. Fig. 3 is a detail view of one end of my invention.

My invention consists of two guide-rails A of the desired length, which have notches $a$ cut in their edges facing each other and are secured to the window-frame B, one on each side the window. A bar C, in two parts $c$ and $c'$, which overlap and allow said bar C to be adjusted longitudinally, extends across the guide-rails A, to which it is attached by slides $c^2$. The outer ends of the bar C are turned outward at right angles and form brackets $c^3$ to receive the ends of the roller D. Two arms E are pivotally connected together, their lower ends $e$ forming the handle and their upper ends consisting of two hollow arms $e'$, at the ends of which thumb-screws $e^2$ are fixed. Placed in the lower part of the hollow arms $e'$, just above where the arms E are pivoted, is a V-shaped spring F, which presses the upper ends $e'$ of the arms E apart. A rod G on each side, passing through a sleeve F', secured to the bar C, has its end in the slide $c^2$ and normally engaging one of the notches $a$. The lower ends of the rods G fit in the hollow arms $e'$, where they are secured by the thumb-screws $e^2$.

The operation of my invention is as follows: The parts all being as shown in Fig. 1, the lower ends $e$ of the arms E are pressed together. This draws the ends of the rods G from contact with the notches $a$, and the bar C, carrying the roller D and shade, may be raised or lowered at pleasure. When the ends $e$ are released, the spring F immediately throws the ends of the rods G outward, causing them when opposite to enter the notches $a$ and hold the bar C at that point.

Having thus described my invention, what I claim as new, and desire to secure by Letters Patent, is—

1. In a window-shade adjuster provided with notched guide-rails and an adjustable roller-carrying bar slidably mounted on said rails, sleeves secured to said bar, and pivoted spring-arms having their ends passing through said sleeves and adapted normally to engage said notches, substantially as shown and described.

2. In a window-shade adjuster provided with notched guide-rails and an adjustable roller-carrying bar slidably mounted on said rails, sleeves secured to said bar and pivoted spring-operated arms having their ends in said sleeves and adapted to engage said notches normally, substantially as shown and described.

3. In a window-shade adjuster provided with notched guide-rails and an adjustable roller-carrying bar slidably mounted on said rails, sleeves secured to said bar, two arms pivotally connected near the center, the lower ends adapted to form a handle and the upper ends hollow, two rods adapted to enter said hollow ends and be secured there, the upper ends of said rods, moving in said sleeves and adapted normally to engage said notches, substantially as shown and described.

4. In a window-shade adjuster provided with notched guide-rails and an adjustable roller-carrying bar slidably mounted on said rails, sleeves secured to said bar, two arms pivotally connected near the center, the lower ends adapted to form a handle and the upper ends hollow, a V-shaped spring in the lower part of said hollow ends normally pressing the upper ends apart, two rods adapted to enter said hollow ends and be secured there, the upper ends of said rods moving in said sleeves and adapted normally to engage said notches, substantially as shown and described.

In testimony whereof I hereto affix my signature in the presence of two witnesses.

JOHN P. BADE.

Witnesses:
B. F. PINNELL,
CHRISTIAN JESSEN.